(12) United States Patent
Hughes, Jr.

(10) Patent No.: US 7,277,399 B1
(45) Date of Patent: Oct. 2, 2007

(54) HARDWARE-BASED ROUTE CACHE USING PREFIX LENGTH

(75) Inventor: John H. Hughes, Jr., San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1051 days.

(21) Appl. No.: 10/118,116

(22) Filed: Apr. 8, 2002

(51) Int. Cl.
*H04L 12/28* (2006.01)
*H04L 12/54* (2006.01)
*G06F 12/00* (2006.01)
*G06F 15/173* (2006.01)

(52) U.S. Cl. ............... 370/252; 370/255; 370/392; 370/412; 370/428; 709/238; 709/242; 711/118; 711/212; 711/216; 711/221

(58) Field of Classification Search ......... 370/252, 370/255, 392, 412, 428; 709/238, 242; 711/118, 711/212, 216, 221
See application file for complete search history.

(56) References Cited

U.S. PATENT DOCUMENTS

| | | | | |
|---|---|---|---|---|
| 5,157,774 A | * | 10/1992 | Culley | 711/139 |
| 5,414,827 A | * | 5/1995 | Lin | 711/135 |
| 5,949,786 A | * | 9/1999 | Bellenger | 370/401 |
| 5,978,951 A | * | 11/1999 | Lawler et al. | 714/758 |
| 6,157,644 A | * | 12/2000 | Bernstein et al. | 370/392 |
| 6,266,706 B1 | * | 7/2001 | Brodnik et al. | 709/242 |
| 6,295,582 B1 | * | 9/2001 | Spencer | 711/135 |
| 6,308,219 B1 | | 10/2001 | Hughes | 709/238 |
| 6,496,692 B1 | * | 12/2002 | Shanahan | 455/418 |
| 6,546,391 B1 | | 4/2003 | Tsuruoka | 707/8 |
| 6,631,419 B1 | * | 10/2003 | Greene | 709/238 |
| 6,687,247 B1 | | 2/2004 | Wilford et al. | 370/392 |
| 6,768,739 B1 | * | 7/2004 | Kobayashi et al. | 370/392 |
| 6,876,655 B1 | * | 4/2005 | Afek et al. | 370/392 |
| 6,956,858 B2 | * | 10/2005 | Hariguchi et al. | 370/395.31 |
| 6,993,031 B2 | * | 1/2006 | Murase | 370/395.32 |
| 7,007,101 B1 | * | 2/2006 | Schwaderer | 709/238 |
| 2002/0116527 A1 | * | 8/2002 | Chen et al. | 709/245 |
| 2003/0065812 A1 | * | 4/2003 | Beier et al. | 709/236 |

* cited by examiner

*Primary Examiner*—Alpus H. Hsu
(74) *Attorney, Agent, or Firm*—Campbell Stephenson LLP

(57) ABSTRACT

The present invention defines a system and method of routing packets using a hardware-based route cache with prefix length. When a router receives a packet, the router first searches for the routing information in the hardware-based route cache and if a match is found, the packet is forwarded to according to the routing information. The hardware-based route cache can be configured according to a search scheme employed by the router. The hardware-based route cache can be configured to provide network address length information for the destination addresses included in an incoming packet.

106 Claims, 4 Drawing Sheets

HARDWARE-BASED ROUTE CACHE USING PREFIX LENGTH

BACKGROUND OF THE INVENTION

1. Field of the Invention

This invention relates to the field of packet switching and packet routing and more particularly relates to packet forwarding.

2. Description of the Related Art

Generally, a router in a network uses routing tables to lookup a destination address to compute network routing and forward an incoming packet. Routing tables typically store millions of destination addresses for network hosts. Routing tables are periodically updated to reflect the active status of hosts in the network. When a packet arrives at the a router, the router extracts the destination information from packet header and searches the routing table for the destination route. Because the routing tables are based on conventional memory technology and contain a large amount of routing information, a search for the destination route can take significant amount of time and in some cases, may cause the router to drop the incoming packet due to certain timeout limits.

One method to resolve route lookup delay is to implement a route cache. Typically, a route cache is a software-based search table. A route cache is a comparatively smaller lookup table that stores the addresses of certain selected destinations (e.g., most frequently accessed destinations, recently accessed destinations and the like). When the router receives a packet, the router first searches the route cache for routing information and if the routing information is found in the route cache, the router forwards the packet to appropriate destination. Because the route cache is smaller, the search time is significantly less than the search time of larger lookup tables. The route cache is populated based on statistical and data traffic analysis done by each router in the network. A problem with software-based route caches is that the router keeps adding destination addresses to the route cache until the length of route cache reaches a certain maximum limit and the search efficiency starts degrading router's performance. The router then flushes the route cache (clears all the entries in the cache) and repopulates the route cache. The flushing and repopulating of the route cache causes additional delays for packet routing. This additional delay severely affects router performance and limits the maximum allowable throughput of the router.

SUMMARY in an embodiment, the present invention describes a method of routing a first packet in a network. The method includes locating a routing information using one or more parameters of the first packet in a hardware-based route cache wherein the hardware-based route cache is configured according to one of a plurality of search schemes. The hardware-based route cache can be fully associative cache, set associative cache, direct-mapped cache or the like. The method further includes receiving the first packet.

The method further includes reducing a size of the parameter before locating the routing information. In an embodiment, the size of the parameter is reduced according to a predetermined size. In another embodiment, the size of the parameter is dynamically reduced. The method further includes determining one or more active bits of the parameter and using the active bits to locate the routing information. In one embodiment, the one or more active bits are dynamically determined. In another embodiment, the one or more active bits are predetermined.

The method further includes if the routing information is not located in the hardware-based route cache, locating the routing information in a routing table. The method further includes forwarding the first packet. The method further includes determining if the parameter of the first packet is cacheable and if the parameter of the first packet is cacheable updating the hardware-based route cache with the parameter.

The updating the hardware-based route cache further includes determining if the hardware-based route cache is full and if the hardware-based route cache is not full updating the hardware-based route cache with the parameter. The method further includes if the hardware-based route cache is full, identifying a removable entry in the hardware-based route cache, deleting the removable entry from the hardware-based route cache and updating the hardware-based route cache with the parameter. In an embodiment, the identifying the removable entry is done on a first-in-first-out basis. In an embodiment, the identifying the removable entry is done on least recently used basis. In an embodiment, the identifying the removable entry is done randomly. In an embodiment, the identifying the removable entry is done on oldest entry basis.

The method further includes when the router receives a network topology update updating the routing table and determining whether the hardware-based route cache requires updating. The method further includes if the hardware based route cache requires updating, updating the hardware-based route cache. In an embodiment, the updating the hardware-based route cache is done by removing at least one entry corresponding to the network topology update In an embodiment, the updating the hardware-based route cache is done by flushing the hardware-based route cache.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE DRAWINGS

The following is intended to provide a detailed description of an example of the invention and should not be taken to be limiting of the invention itself. Rather, any number of variations may fall within the scope of the invention which is defined in the claims following the description.

Introduction

The present invention defines a system and method of routing incoming packets using a hardware-based route cache to lookup routing information for the incoming packets. The hardware-based route cache can be configured according to a search scheme employed by the router. Each entry of the hardware-based route cache can be further configured with a predetermined memory location size. Each entry represents a portion of the destination address of the incoming packets. When the router receives an incoming packet, the router looks up the routing information in the hardware-based route cache as opposed to the memory-based search tables. If a match is found, the packet is forwarded according to the routing information. The size of the entries in the hardware-based route cache can be configured according to the size of the destination address used by the router to locate the routing information for the incoming packet. When the router locates the routing information in the hardware-based route cache, the router determines the length of the destination address according to the number of entries searched in the memory-based search table, which is stored in the hardware-based route cache with the matching address. The destination address length information is further used to expedite the search for next incoming packet.

Hardware-Based Route Cache

Typically, a data packet in an internetworking environment include a header and a data segment. The header segment of the information packet includes packet destination address. The destination address of a packet further includes a network address and a host address. The network address identifies a specific network within the internetworking environment and the host address identifies a specific host within that network. There can be multiple hosts within a network. The packets destined for different hosts within specific network include common network address.

Figure 1:
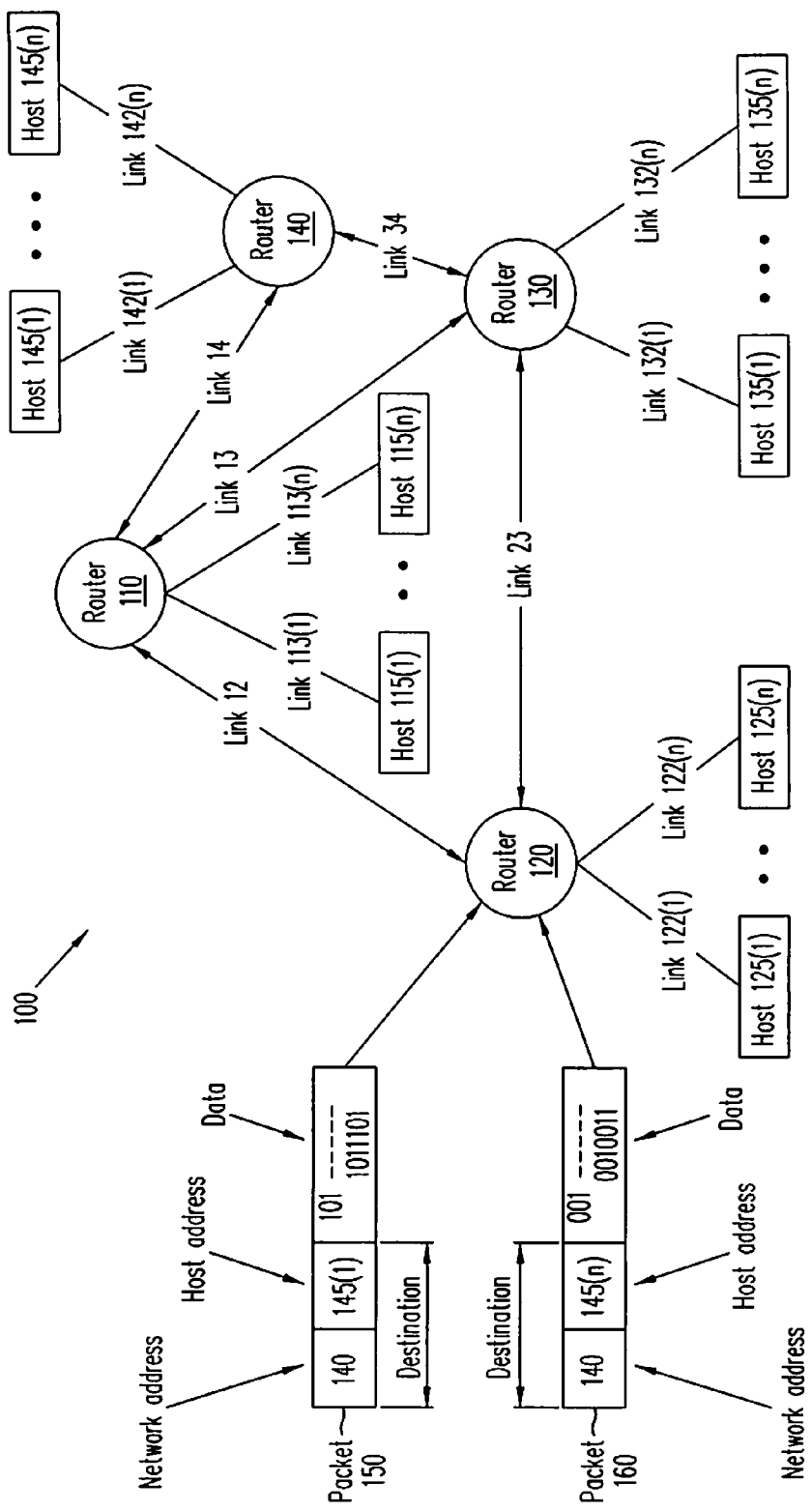
FIG. 1 illustrates an example of a typical internetworking environment.

FIG. 1 illustrates an example of a typical internetworking environment 100. Internetworking environment 100 includes four routers, routers 110-140. Router 110 is coupled to router 120 via a link 12, to router 130 via a link 13 and to router 140 via a link 14. Router 120 is couple to router 130 via a link 23. Router 130 is couple to router 140 via a link 34. Each router is coupled to 'n' local hosts. Router 110 is coupled to host 115(1)-(n) via links 113(1)-(n). Router 120 is coupled to hosts 120(1)-(n) via links 122(1)-(n). Router 130 is coupled to hosts 135(1)-(n) via links 132(1)-(n). Router 140 is coupled to hosts 145(1)-(n) via links 142(1)-(n).

Router 120 receives two data packets, packet 150 and packet 160 in that order. Packet 150 is destined for host 145(1) coupled to router 140 and packet 160 is destined for host 145(n) coupled to router 140. When packet 150 arrives at router 120, router 120 retrieves the destination address from packet 150 and looks up a route for packet 150 in a routing table. After computing the routing for packet 150, router 120 forwards packet 150 to router 140 for host 145(1). When router 120 receives packet 160, router 120 locates the routing information for packet 160. Because packet 160 is destined for router 140, the network routing for packet 160 is the same as for packet 150 even when packet 160 is destined for a different host coupled to router 140. Thus, router 120 only needs to know the network address of packet 160.

After routing packet 150 to router 140, if router 120 saves the routing information for router 140 in a cache, when packet 160 arrives at router 120, router 120 needs only to extract the network address from packet 160, look up route from the cache and route packet 160 to router 140. Because the route for router 140 was calculated for packet 150, packet 160 does not have to wait for route search to be processed. By saving routing information in the cache, router 120 saves searching time for duplicate route lookup. When router 120 receives multiple packets for router 140, router 120 can save time for multiple lookups by saving the routing information in the cache.

A hardware-based route cache can provide fast route lookup using the network address portion of the destination address because the hardware-based route caches are faster than, for example, memory-based search trees. The memory-based search trees employ complex software algorithms that require search and comparison of the destination addresses in a large memory. When the number of destinations increase, the search time also increases proportionally. The hardware-based route cache can be configured according to any search scheme employed by a router. A portion of destination and sub-net address can be stored in the hardware-based route cache. The subsequent search for packets with common destination or sub-net is done by locating the portion of the address in the hardware-based route cache.

Cache Organization

Figure 2:
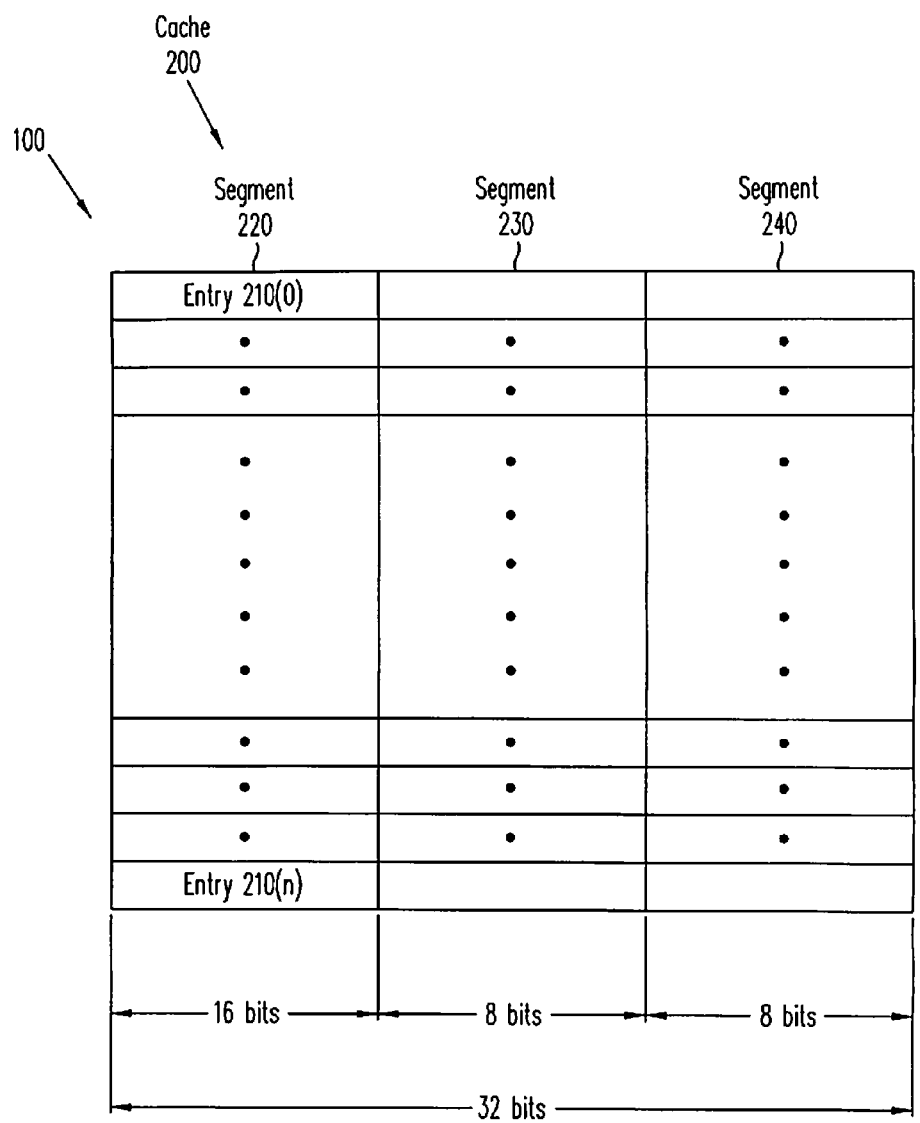
FIG. 2 illustrates an example of the cache organization of a hardware-based route cache according to an embodiment of the present invention.

FIG. 2 illustrates an example of the cache organization of hardware-based route cache 200 according to an embodiment of the present invention. Hardware-based route cache 200 can be used to store any search parameter for an incoming packet (e.g., source address, destination address, incoming port or the like). For illustration purposes, in the present example, network destination address of the incoming packet is used as the search parameters. In the present example, the network destination addresses are 32 bits long. The network destination address may include a network address and a host address.

Hardware-based route cache 200 includes 'n' memory locations that can store 'n' destination entries, entry 210(0)-(n). The memory locations representing the network destination addresses in hardware-based route cache 200 are 32 bits wide. It will be apparent to one of the skill in the art that, while specific lengths are described, network destination addresses and memory locations discussed here may be of any appropriate length (e.g., to support multiple protocol requirements such as IPv6, MPLS or the like). For lookup purposes, in the present example, each memory location is divided into three segments, segments 220, 230 and 240. Segment 220 is 16 bits wide, segment 230 is 8 bits wide and segment 240 is 8 bits wide. Memory locations in the hardware cache can be divided into any number of segments using any combination of bits to conform to the search parameter (e.g., destination address, source address, port address or the like) and search scheme employed to search hardware-based route cache 200. In the present example, each segment represents a portion of network destination address.

Functioning of a Cache According to Embodiments of the Present Invention

In the present example, when a router receives a first data packet, the router extracts network destination address from the first data packet header for the route lookup. However, one skilled in the art will appreciate that any packet parameter (e.g., source address, port address or the like or combination thereof) can be used for route lookup. Hardware-based cache 200 lookup can be improved by reducing the number of bits used to locate an entry in hardware-based cache 200. The hashing of the destination address can reduce the number of bits for lookup. The number of bits can be reduced to a number of addressable entries in the cache.

Typically, the destination addresses of subsequent packets differ from the first data packet by a small number of bits representing different hosts within a network. The router can dynamically determine the number of active bits in the destination addresses of the subsequent data packets. For example, by monitoring the changes in the destination addresses of subsequent packets, the number of active bits (e.g., bits differing in the destination addresses of subsequent packets) can be identified. In another example, a user can run traces on destination addresses and determined which bits are most active and then use those bits to expedite search for next packet (e.g., 20-bits for MPLS, 128-bits for Ipv6, 32 bits for Ipv4 or the like). One skilled in art will appreciate that the active bits can be identified using various methods (e.g., pre-programming the router, predetermining certain bits of the destination addresses, performing statistical analysis of the router traffic or the like or combination thereof).

The hashing of the active bits of the destination address can be used to spread entries around the hardware-based cache 200. The route for the packet can be computed by matching only the net address in the hardware-based cache. The hardware-based cache 200 stores the net mask derived by the lookup of the first packet in the cache so that the subsequent packets with similar but different addresses will 'hit' the prior cache entry.

According to an embodiment of the present invention, the search in hardware-based route cache 200 can be expedited by performing the search according to the number of the active bits in the destination address. For example, if the destination address of a large number of incoming packets differ from each other at certain bits (e.g., bits 15 and 16 or the like) then these active bits (e.g., bits 15 and 16 or the like) can be used to expedite the search in the hardware-based cache 200 (e.g., by hashing the active bits or the like). In another example, if none of destination addresses of incoming packets require search beyond 16 bits then the search for subsequent data packets can be performed using 16 bits of the destination address.

Once a lookup process is determined (e.g., hashing of address or of certain bits, identified number of bits, predetermined bits or the like or combination thereof), the router looks up the result in hardware-based route cache 200. The search is conducted in parallel. If a match is found in hardware-based route cache 200, the router computes the routing for the data packet and routes the data packet accordingly. The search in the hardware-based route cache 200 can be conducted using any scheme to locate a data match (e.g., direct mapped, associative, set associative and the like). For example, in direct mapped search, the destination address of the incoming packet is initially reduced to a predetermined number of bits (e.g., a 32 bits address to a 8-bit identifier or the like).

The method of reducing the destination address to a predetermined number of bits is known in the art. If the destination address is reduced to a 8-bits identifier then the search is performed for 256 entries in hardware-based route cache 200 and the entries are compared against the destination address. In a set associative mapping, the search is performed to map the destination address to a predetermined number of entries. If a match is found for any entry, the routing information is determined using the matched entry. In a fully associative mapping, a full mapping of the destination address is performed.

When a match of the destination address of the first data packet is found within 16 bits of an entry in hardware-based route cache 200 then in one example, the destination address mapping for the next packet can be performed for 16 bits. Similarly, if a match of the destination address of the first data packet is found within 24 bits of an entry then the destination address matching for the next packet can be done for 24 bits and so on.

Hardware-based route cache 200 can be configured to store the entries for multiple protocols (e.g., IPv6, labels for MPLS or the like). The entries in hardware-based route cache 200 can be configured to search the destination and sub-net addresses accordingly. For example, MPLS generally requires label lookup. The labels can be looked up using tree-based search and the search information then can be rolled back into hardware-based route cache 200 using artificial net masks representing MPLS labels.

Cache Update

When a router receives a packet destined for a host in a network, the router first searches a hardware-based route cache to lookup routing information for the host. If a match in the hardware-based route cache is not found, then the router proceeds to lookup information in the routing table. Generally, in data networking, when information is packetized, more than one packets are generated. Thus, more than one packet with a common destination address may arrive at the router. When the router receives a packet with a destination address that is not cached, the router may cache that destination address so that when more packets with same destination are received, the lookup time can be saved and packets can be processed faster.

Hardware-based route cache can be configured as self-managed cache. When the hardware-based route cache is full and the router receives a packet with new destination address that requires caching, the router can replace an existing entry in the hardware-based route cache. The router may employ multiple schemes to replace certain entries in the hardware-based route cache (such as, for example, first-in-first-out (FIFO), least recently used address, least active address, oldest address, low priority address, random selection or the like). The advantage of hardware-based route cache over conventional search methods is that individual entry in the hardware-based route cache can be replaced without flushing the cache. Frequent arrival of packets with non-cached destinations when the cache is full, may require frequent flushing and rebuilding of a memory-based search table. However, in a hardware-based route cache, individual entries can be replaced without the flushing and rebuilding of the cache.

In one embodiment of the present invention, when network topology is updated (i.e., e.g., network addresses of destinations are changed, servers are removed from service or the like), the router receives topology updates including new destination addresses. The router then updates the routing tables accordingly. Once the routing tables are updated, the router can determine whether to update the hardware-based route cache, if the hardware-based route cache requires updating, the respective entry in the hardware-based route cache can be repopulated to reflect the change in the routing table. In one embodiment, the router can flush the hardware-based route cache and rebuild the hardware-based route cache to reflect the updated network topology. In an embodiment, the router can select the individual entries in the hardware-based route cache that require updating and updates the individual entry without flushing the hardware-based route cache.

Hardware-Based Route Cache System

Figure 3:
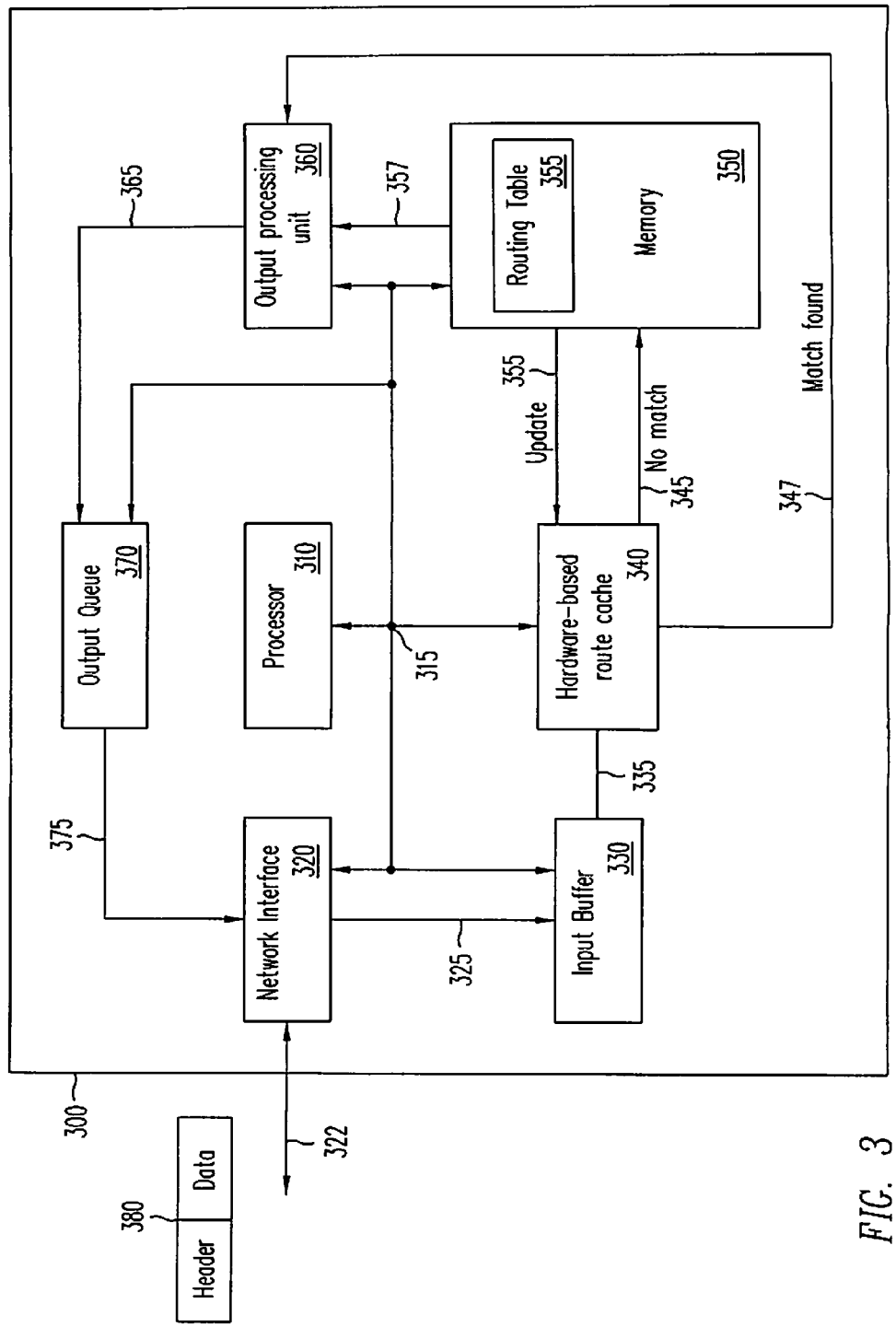
FIG. 3 illustrates a packet routing system with hardware-based route cache according to an embodiment of the present invention.

FIG. 3 illustrates a packet routing system 300 ("router 300") with a hardware-based route cache according to an embodiment of the present invention. Router 300 includes a processor 310. Processor 310 is coupled to various components of router 300 via a control and data link 315. A network interface 320 is coupled to processor 310. Network interface 320 provides input and output interface with other network elements for router 300 via an input/output link 327. Network interface 325 is coupled to an input buffer 330 via a link 325. Input buffer 330 stores incoming data packets while the data packets await processing. Input buffer 330 is coupled to a hardware cache 340 via a link 335. Hardware cache 340 stores the routing information of frequently accessed destinations in the network. Hardware cache 340 is coupled to a memory 350 via a link 345. Hardware cache 340 is further coupled to an output-processing unit 360 via a link 347. Memory 350 is coupled to hardware cache 340 via a link 355. Memory 350 is coupled to output-processing unit 360 via a link 357. For illustration purposes, while individual links are shown between various components of router 300, it will be apparent to those of skill in the art that these links can be implemented in various forms (i.e., e.g., two-way links, combined links, multiplexed links or the like).

Memory 350 is depicted as holding a routing table 355. Routing table 355 stores the routing information for network destinations coupled to router 300. When router 300 receives a data packet 380, router 300 extracts the destination information from the header of data packet 380. Router 300 first searches for a match for the routing information for data packet 380 in hardware cache 340. If a match is found in hardware cache 340, router 300 forwards data packet 380 to output-processing unit 360. If a match is not found in hardware cache 340, router 300 forwards data packet 380 to memory 350 to search for routing information in routing table 355.

When the routing information for data packet 380 is located in routing table 355, router 300 forwards data packet 380 to output-processing unit 360. When the destination of data packet 380 is accessed frequently, router 300 can update hardware cache 340 to include the routing information for the destination of data packet 380 to avoid frequent lengthy lookups in routing table 355. Output-processing unit 360 is coupled to an output queue 370 via a link 365. Output queue 370 is a memory buffer and stores data packet 380 for forwarding. Output queue 370 can be configured using any memory management scheme (e.g., first-in-first-out buffer, first-in-last-out buffer, a table in memory 350 or the like). Output-processing unit 360 processes data packet 380 for forwarding and forwards data packet 380 to output queue 370. Output queue 360 is coupled to network interface 320 via a link 375. Output queue stores data packet 380 for forwarding to the next destination in the network. In the present example, for illustration purposes, individual links are described, however it will be apparent to one skilled in the art that these links can be configured using various transport techniques (i.e., e.g., multiplexed links, two-way links or the like). Similarly, buffers and queues can be configured using various memory techniques (e.g., combining buffers in main memory, defining a section of main memory as input/output queue or the like).

Figure 4:
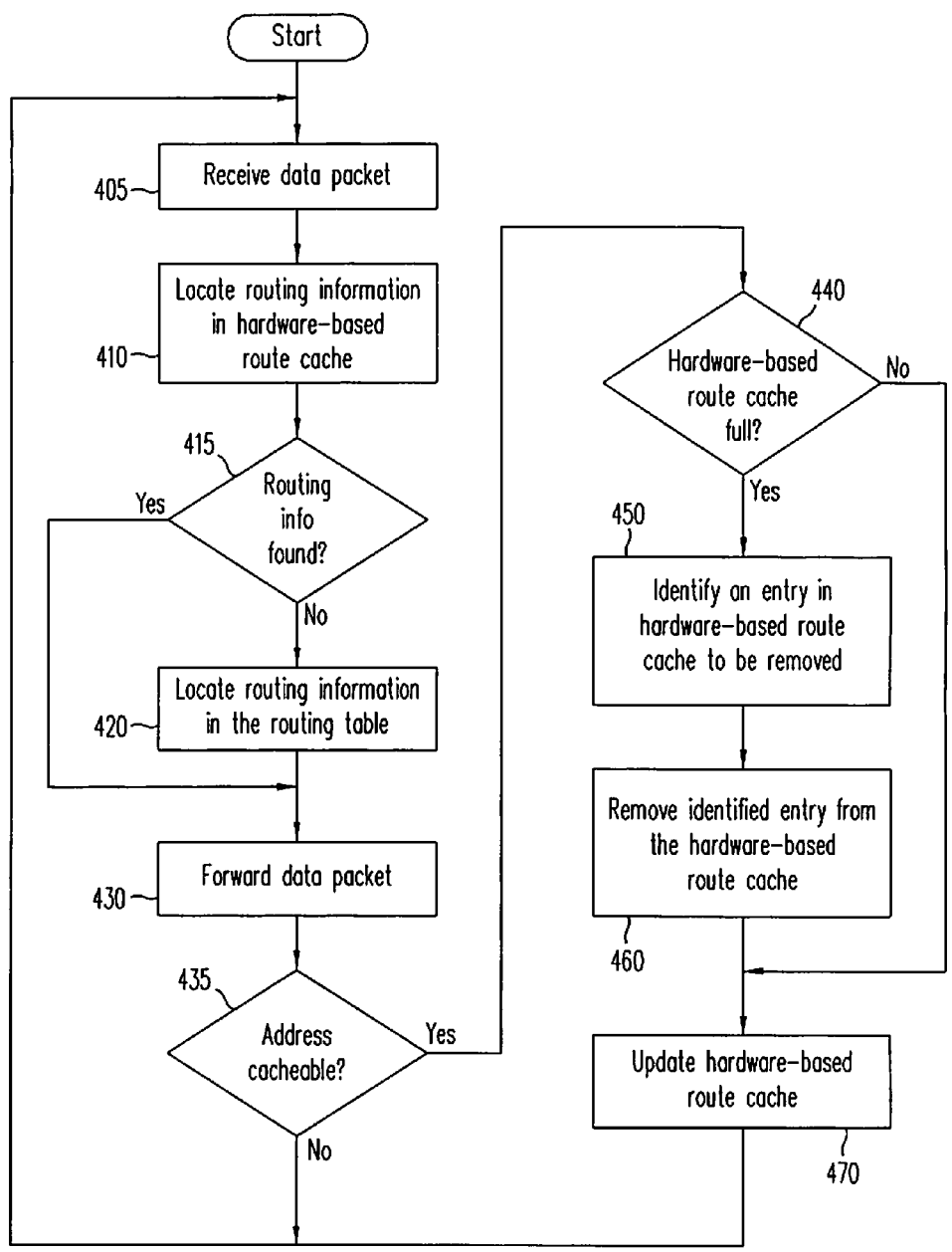
FIG. 4 is a flow chart illustrating the steps performed by a router during a process of packet routing using a hardware-based route cache according an embodiment of the present invention.

FIG. 4 is a flow diagram illustrating the steps performed by a router during a process of packet routing using a hardware-based route cache according an embodiment of the present invention. Initially, the router receives a data packet (step 405). The router searches the hardware-based route cache for the routing information (step 410). The router determines whether the routing information is in the hardware-based route cache (step 415). If the routing information is found in the hardware-based route cache, the router proceeds to forward the data packet (step 430). If the routing information is not found in the hardware-based route cache, the router locates the routing information in a routing table (step 420). After locating the routing information, the router forwards the data packet (step 430). The router determines whether the routing information of the data packet is cacheable (step 435). If the routing information of the data packet is not cacheable, the router proceeds to receive next data packet (step 405). If the routing information of the data packet is cacheable, the router determines whether the hardware-based route cache is full (step 440). If the hardware-based route cache is not full, the router proceeds to update the hardware-based route cache (step 470). If the hardware-based route cache is full, the router identifies an entry in the hardware-based route cache that can be deleted (step 450). As previously noted herein, the update of hardware-based route cache can employ multiple schemes (e.g., FIFO, priority based and the like). The router removes the identified entry from the hardware-based route cache (step 460). The router updates the hardware-based route cache (step 470). The actions involved in updating the hardware-based route cache can be performed in any order. For example, the router can update the hardware-based route cache before forwarding the data packet.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of routing a first packet in a network, the method comprising:
    locating routing information in a hardware-based route cache using one or more parameters of said first packet, wherein said hardware-based route cache indicates a destination address length, wherein
    said locating said routing information in said hardware-based route cache comprises using said destination address length,
    said using said destination address length comprises using fewer than all bits of a destination address of said first packet to locate said routing information in said hardware-based route cache, and
    said destination address length identifies which bits of said destination address to use when locating said routing information in said hardware-based route cache.

2. The method of claim 1, wherein said hardware-based route cache is fully associative cache.

3. The method of claim 1, wherein said hardware-based route cache is set associative cache.

4. The method of claim 1, wherein said hardware-based route cache is direct mapped cache.

5. The method of claim 1, further comprising:
    receiving said first packet.

6. The method of claim 1, wherein one of said parameters is a destination address of said first packet.

7. The method of claim 1, wherein one of said parameters is a source address of said first packet.

8. The method of claim 1, wherein one of said parameters is a port address.

9. The method of claim 1, further comprising:
reducing a size of said parameter before locating said routing information.

10. The method of claim 9, wherein said size of said parameter is reduced according to a predetermined size.

11. The method of claim 9, wherein said size of said parameter is dynamically reduced.

12. The method of claim 11, further comprising:
determining one or more active bits of said parameter; and
using said active bits to locate said routing information.

13. The method of claim 12, wherein said one or more active bits are dynamically determined.

14. The method of claim 12, wherein said one or more active bits are predetermined.

15. The method of claim 1, further comprising:
if said routing information is not located in said hardware-based route cache, locating said routing information in a routing table.

16. The method of claim 15, further comprising:
forwarding said first packet.

17. The method of claim 1, further comprising:
determining if said parameter of said first packet is cacheable; and
if said parameter of said first packet is cacheable,
updating said hardware-based route cache with said parameter.

18. The method of claim 17, wherein said updating said hardware-based route cache further comprising:
determining if said hardware-based route cache is full; and
if said hardware-based route cache is not full,
updating said hardware-based route cache with said parameter.

19. The method of claim 18, further comprising:
if said hardware-based route cache is full,
identifying a removable entry in said hardware-based route cache,
deleting said removable entry from said hardware-based route cache, and
updating said hardware-based route cache with said parameter.

20. The method of claim 19, wherein said identifying said removable entry is done on a first-in-first-out basis.

21. The method of claim 19, wherein said identifying said removable entry is done on least recently used basis.

22. The method of claim 19, wherein said identifying said removable entry is done randomly.

23. The method of claim 19, wherein said identifying said removable entry is done on oldest entry basis.

24. The method of claim 1, wherein said hardware-based route cache comprises a plurality of memory locations.

25. The method of claim 24, wherein said plurality of memory locations are configured into a plurality of search tables.

26. The method of claim 25, wherein each one of said plurality of search tables is configured according to a plurality of addressing schemes of a plurality of protocols.

27. The method of claim 1, further comprising:
when a router receives a network topology update,
updating a routing table, and
determining whether said hardware-based route cache requires updating.

28. The method of claim 27, further comprising:
if said hardware based route cache requires updating,
updating said hardware-based route cache.

29. The method of claim 28, wherein said updating said hardware-based route cache is done by removing at least one entry corresponding to said network topology update.

30. The method of claim 28, wherein said updating said hardware-based route cache is done by flushing said hardware-based route cache.

31. The method of claim 1, wherein a size of an entry within said hardware-based route cache indicates said destination address length.

32. The method of claim 1, wherein said hardware-based route cache stores information indicating said destination address length.

33. The method of claim 32, wherein the information comprises a net mask.

34. The method of claim 1, wherein said destination address length is determined based on how many entries in a memory-based search table are searched to find routing information corresponding to a packet.

35. The method of claim 1, further comprising:
storing a net mask in the hardware-based route cache, wherein the net mask is derived by looking up a packet.

36. The method of claim 1, wherein said destination address length indicates a network address length.

37. The method of claim 1, further comprising:
extracting a network address portion of a destination address of said first packet, wherein, of information within said first packet, said locating said routing information uses only said network address portion of said destination address.

38. A system comprising:
a hardware-based route cache, said hardware-based route cache indicates a destination address length, and
a processor coupled to said hardware-based route cache, said processor is configured to locate said routing information in said hardware-based route cache, wherein
said processor is configured to locate said routing information in said hardware-based route cache using fewer than all bits of a destination address of said first packet to locate said routing information in said hardware-based route cache; and
said destination address length identifies which bits of said destination address to use when locating said routing information in said hardware-based route cache.

39. The system of claim 38, further comprising a network element, wherein said network element comprises said hardware-based route cache and said processor.

40. The system of claim 39, further comprising:
an input buffer coupled to said processor, said input buffer holds a packet while said processor locates said routing information; and
an output queue coupled to said processor, said output queue holds said packet while said packet awaits forwarding.

41. The system of claim 40, further comprising:
a network interface coupled to said processor, said network interface provides an interface to a network for said network element; and
an output processing unit coupled to said processor, said output processing unit processes said packet for forwarding.

42. The system of claim 41, further comprising:
a memory coupled to said processor, said memory comprises a routing table.

43. A system for routing a first packet in a network, the system comprising:
means for locating routing information in a hardware-based route cache using one or more parameters of said first packet, wherein said hardware-based route cache indicates a destination address length, and
means for locating said routing information in said hardware-based route cache using fewer than all bits of a destination address of said first packet to locate said routing information in said hardware-based route cache, wherein
said destination address length identifies which bits of said destination address to use when locating said routing information in said hardware-based route cache.

44. The system of claim 43, wherein said hardware-based route cache is fully associative cache.

45. The system of claim 43, wherein said hardware-based route cache is set associative cache.

46. The system of claim 43, wherein said hardware-based route cache is direct mapped cache.

47. The system of claim 43, further comprising:
means for receiving said first packet.

48. The system of claim 43, wherein one of said parameters is a destination address of said first packet.

49. The system of claim 43, wherein one of said parameters is a source address of said first packet.

50. The system of claim 43, wherein one of said parameters is a port address.

51. The system of claim 43, further comprising:
means for reducing a size of said parameter before locating said routing information.

52. The system of claim 51, wherein said size of said parameter is reduced according to a predetermined size.

53. The system of claim 51, wherein said size of said parameter is dynamically reduced.

54. The system of claim 53, further comprising:
means for determining one or more active bits of said parameter; and
means for using said active bits to locate said routing information.

55. The system of claim 54, wherein said one or more active bits are dynamically determined.

56. The system of claim 54, wherein said one or more active bits are predetermined.

57. The system of claim 43, further comprising:
means for locating said routing information in a routing table if said routing information is not located in said hardware-based route cache.

58. The system of claim 57, further comprising:
means for forwarding said first packet.

59. The system of claim 43, further comprising:
means for determining if said parameter of said first packet is cacheable; and
means for updating said hardware-based route cache with said if said parameter of said first packet is cacheable.

60. The system of claim 59, wherein said updating said hardware-based route cache further comprising:
means for determining if said hardware-based route cache is full; and
means for updating said hardware-based route cache with said parameter if said hardware-based route cache is not full.

61. The system of claim 60, further comprising:
means for identifying a removable entry in said hardware-based route cache if said hardware-based route cache is full;
means for deleting said removable entry from said hardware-based route cache if said hardware-based route cache is full; and
means for updating said hardware-based route cache with said parameter if said hardware-based route cache is full.

62. The system of claim 61, wherein said identifying said removable entry is done on a first-in-first-out basis.

63. The system of claim 61, wherein said identifying said removable entry is done on least recently used basis.

64. The system of claim 61, wherein said identifying said removable entry is done randomly.

65. The system of claim 61, wherein said identifying said removable entry is done on oldest entry basis.

66. The system of claim 43, wherein said hardware-based route cache comprises a plurality of memory locations.

67. The system of claim 66, wherein said plurality of memory locations are configured into a plurality of search tables.

68. The system of claim 67, wherein each one of said plurality of search tables is configured according to a plurality of addressing schemes of a plurality of protocols.

69. The system of claim 43, further comprising:
means for updating a routing table when a router receives a network topology update; and
means for determining whether said hardware-based route cache requires updating when said router receives a network topology update.

70. The system of claim 69, further comprising:
updating said hardware-based route cache if said hardware based route cache requires updating.

71. The system of claim 70, wherein said updating said hardware-based route cache is done by removing at least one entry corresponding to said network topology update.

72. The system of claim 70, wherein said updating said hardware-based route cache is done by flushing said hardware-based route cache.

73. A computer program product for routing a first packet in a network, encoded in computer readable media, the program product comprising a set of instructions executable on a computer system, the set of instructions is configured to
locate routing information in a hardware-based route cache using one or more parameters of said first packet, wherein said hardware-based route cache indicates a destination address lengthy; and
locate said routing information in said hardware-based route cache using fewer than all bits of a destination address of said first packet to locate said routing information in said hardware-based route cache, wherein
said destination address length identifies which bits of said destination address to use when locating said routing information in said hardware-based route cache.

74. The computer program product of claim 73, wherein said hardware-based route cache is fully associative cache.

75. The computer program product of claim 73, wherein said hardware-based route cache is set associative cache.

76. The computer program product of claim 73, wherein said hardware-based route cache is direct mapped cache.

77. The computer program product of claim 73, wherein the set of instructions is further configured to receive said first packet.

78. The computer program product of claim 73, wherein one of said parameters is a destination address of said first packet.

79. The computer program product of claim 73, wherein one of said parameters is a source address of said first packet.

80. The computer program product of claim 73, wherein one of said parameters is a port address.

81. The computer program product of claim 73, wherein the set of instructions is further configured to
reduce a size of said parameter before locating said routing information.

82. The computer program product of claim 81, wherein said size of said parameter is reduced according to a predetermined size.

83. The computer program product of claim 81, wherein said size of said parameter is dynamically reduced.

84. The computer program product of claim 83, wherein the set of instructions is further configured to
determine one or more active bits of said parameter; and
use said active bits to locate said routing information.

85. The computer program product of claim 84, wherein said one or more active bits are dynamically determined.

86. The computer program product of claim 84, wherein said one or more active bits are predetermined.

87. The computer program product of claim 73, wherein the set of instructions is further configured to
if said routing information is not located in said hardware-based route cache, locate said routing information in a routing table.

88. The computer program product of claim 87, wherein the set of instructions is further configured to
forward said first packet.

89. The computer program product of claim 73, wherein the set of instructions is further configured to
determine if said parameter of said first packet is cacheable; and
if said parameter of said first packet is cacheable,
update said hardware-based route cache with said parameter.

90. The computer program product of claim 89, wherein the set of instructions is further configured to
determine if said hardware-based route cache is full; and
if said hardware-based route cache is not full,
update said hardware-based route cache with said parameter.

91. The computer program product of claim 90, wherein the set of instruction is further configured to
if said hardware-based route cache is full,
identify a removable entry in said hardware-based route cache,
delete said removable entry from said hardware-based route cache, and
update said hardware-based route cache with said parameter.

92. The computer program product of claim 91, wherein said identifying said removable entry is done on a first-in-first-out basis.

93. The computer program product of claim 91, wherein said identifying said removable entry is done on least recently used basis.

94. The computer program product of claim 91, wherein said identifying said removable entry is done randomly.

95. The computer program product of claim 91, wherein said identifying said removable entry is done on oldest entry basis.

96. The computer program product of claim 73, wherein said hardware-based route cache comprises a plurality of memory locations.

97. The computer program product of claim 96, wherein said plurality of memory locations are configured into a plurality of search tables.

98. The computer program product of claim 97, wherein each one of said plurality of search tables is configured according to a plurality of addressing schemes of a plurality of protocols.

99. The computer program product of claim 73, wherein the set of instruction is further configured to
when a router receives a network topology update,
update a routing table, and
determine whether said hardware-based route cache requires updating.

100. The computer program product of claim 99, wherein the set of instruction is further configured to
if said hardware based route cache requires updating,
update said hardware-based route cache.

101. The computer program product of claim 100, wherein said updating said hardware-based route cache is done by removing at least one entry corresponding to said network topology update.

102. The computer program product of claim 100, wherein said updating said hardware-based route cache is done by flushing said hardware-based route cache.

103. A method of routing a first packet in a network, the method comprising:
locating routing information in a hardware-based route cache using one or more parameters of said first packet, wherein said hardware-based route cache indicates a destination address length;
performing a tree-based search to obtain a multi-protocol label switching (MPLS) label; and
storing a net mask in the hardware-based route cache, wherein the net mask represents the MPLS label.

104. A system comprising:
a hardware-based route cache, said hardware-based route cache indicates a destination address length, and
a processor coupled to said hardware-based route cache, wherein
said processor is configured to locate said routing information in said hardware-based route cache, and
said processor is configured to perform a tree-based search to obtain a multi-protocol label switching (MPLS) label and to store a net mask in the hardware-based route cache, wherein the net mask represents the MPLS label.

105. A system for routing a first packet in a network, the system comprising:
means for locating routing information in a hardware-based route cache using one or more parameters of said first packet, wherein said hardware-based route cache indicates a destination address length;
means for performing a tree-based search to obtain a multi-protocol label switching (MPLS) label; and
means for storing a net mask in the hardware-based route cache, wherein the net mask represents the MPLS label.

106. A computer program product for routing a first packet in a network, encoded in computer readable media, the program product comprising a set of instructions execut able on a computer system, the set of instructions is configured to:

locate routing information in a hardware-based route cache using one or more parameters of said first packet, wherein said hardware-based route cache indicates a destination address length perform a tree-based search to obtain a multi-protocol label switching (MPLS) label; and store a net mask in the hardware-based route cache, wherein the net mask represents the MPLS label.

* * * * *